United States Patent
Garcarz et al.

(10) Patent No.: US 11,689,560 B2
(45) Date of Patent: Jun. 27, 2023

(54) NETWORK-WIDE MALWARE MAPPING

(71) Applicant: Cisco Technology, Inc., San Jose, CA (US)

(72) Inventors: Michal Garcarz, Cracow (PL); Piotr Kupisiewicz, Cracow (PL); Pawel Tybinka, Cracow (PL)

(73) Assignee: CISCO TECHNOLOGY, INC., San Jose, CA (US)

( * ) Notice: Subject to any disclaimer, the term of this patent is extended or adjusted under 35 U.S.C. 154(b) by 393 days.

(21) Appl. No.: 16/693,962

(22) Filed: Nov. 25, 2019

(65) Prior Publication Data

US 2021/0160271 A1    May 27, 2021

(51) Int. Cl.
*H04L 9/40* (2022.01)
*G06F 21/56* (2013.01)
*H04L 41/22* (2022.01)

(52) U.S. Cl.
CPC .......... *H04L 63/145* (2013.01); *G06F 21/564* (2013.01); *G06F 21/566* (2013.01); *G06F 21/568* (2013.01); *H04L 41/22* (2013.01); *H04L 63/1416* (2013.01); *H04L 63/1433* (2013.01); *H04L 63/1466* (2013.01); *H04L 63/20* (2013.01)

(58) Field of Classification Search
CPC ............... H04L 63/145; H04L 63/1416; H04L 63/1433; H04L 63/1466; H04L 63/20; H04L 41/22; H04L 41/064; H04L 41/046; G06F 21/566; G06F 21/568; G06F 21/564

See application file for complete search history.

(56) References Cited

U.S. PATENT DOCUMENTS

| | | | |
|---|---|---|---|
| 8,621,610 B2 | 12/2013 | Oberheide et al. | |
| 8,978,137 B2 | 3/2015 | Friedrichs et al. | |
| 8,984,644 B2 | 3/2015 | Oliphant et al. | |
| 9,519,781 B2 | 12/2016 | Golshan et al. | |
| 9,769,250 B2 | 9/2017 | Powers et al. | |
| 9,838,415 B2 | 12/2017 | Powers et al. | |
| 9,928,366 B2 | 3/2018 | Ladnai et al. | |
| 10,027,689 B1 * | 7/2018 | Rathor | H04L 63/1416 |
| 10,805,340 B1 * | 10/2020 | Goradia | H04L 63/145 |
| 2005/0120242 A1 | 6/2005 | Mayer et al. | |

(Continued)

OTHER PUBLICATIONS

Specification for U.S. Appl. No. 62/882,339, originally filed Aug. 2, 2019, 38 pages.*

(Continued)

*Primary Examiner* — Victor Lesniewski

(74) *Attorney, Agent, or Firm* — Edell, Shapiro & Finnan, LLC

(57) ABSTRACT

A network management system is configured to detect one or more malicious activities at one or more devices connected to a network. The network management system is configured to determine a malware root of the one or more malicious activities and generate a network-wide indicating a hierarchical relationship between the malicious activities spawned by the malware root and the malware root. The malicious activities spawned by the malware root represented in the network-wide malware include the one or more malicious activities and include a plurality of malicious activities spawned across a plurality of devices connected to the network.

20 Claims, 6 Drawing Sheets

(56) References Cited

U.S. PATENT DOCUMENTS

| | | | | |
|---|---|---|---|---|
| 2007/0006304 | A1* | 1/2007 | Kramer | G06F 21/554 726/22 |
| 2008/0229421 | A1* | 9/2008 | Hudis | H04L 63/1433 726/25 |
| 2011/0107424 | A1* | 5/2011 | Singh | G06F 21/565 726/24 |
| 2013/0174256 | A1* | 7/2013 | Powers | H04L 63/145 726/23 |
| 2014/0344267 | A1 | 11/2014 | LeBert et al. | |
| 2016/0261614 | A1* | 9/2016 | Agrawal | H04L 63/1475 |
| 2017/0289187 | A1* | 10/2017 | Noel | G06F 16/28 |
| 2017/0302685 | A1* | 10/2017 | Ladnai | H04L 63/145 |
| 2018/0211042 | A1* | 7/2018 | Reinecke | G06F 21/577 |
| 2018/0293330 | A1* | 10/2018 | Kovac | G06F 21/56 |
| 2019/0034634 | A1* | 1/2019 | Hajmasan | G06F 21/55 |
| 2019/0052659 | A1* | 2/2019 | Weingarten | H04L 41/16 |
| 2019/0392146 | A1* | 12/2019 | Gezalov | G06F 21/56 |
| 2020/0099708 | A1* | 3/2020 | Mathews | H04L 43/045 |
| 2020/0342106 | A1* | 10/2020 | Chelarescu | G06F 11/2097 |
| 2021/0004458 | A1* | 1/2021 | Edwards | G06F 21/554 |
| 2021/0019408 | A1* | 1/2021 | Chrysaidos | G06F 21/561 |
| 2021/0035116 | A1* | 2/2021 | Berrington | G06N 5/04 |
| 2021/0037027 | A1* | 2/2021 | Brown | H04L 63/1416 |
| 2021/0042191 | A1* | 2/2021 | Chauhan | G06F 11/1435 |
| 2021/0064751 | A1* | 3/2021 | Li | G06F 21/54 |

OTHER PUBLICATIONS

Drawings for U.S. Appl. No. 62/882,339, originally filed Aug. 2, 2019, 7 pages.*

Li, Nige; Xu, Min; Chen, Mu; Chen, Lu; "A Security Threat Analysis and Evaluation Model for Power Field Operation Terminal," 2017 10th International Conference on Intelligent Computation Technology and Automation (ICICTA), Changsha, China, 2017, pp. 382-385, doi: 10.1109/ICICTA.2017.91.*

AO Kaspersky Lab, "Behavior-based Protection", https://www.kaspersky.com/enterprise-security/wiki-section/products/behavior-based-protection, downloaded Nov. 25, 2019, 6 pages.

SentinelOne, "Fileless Malware Adversaries Quick Win", https://www.sentinelone.com/wp-content/uploads/2017/06/Fileless-Malware-_-Adversaries-Quick-Win.pdf, downloaded Nov. 25, 2019, 5 pages.

* cited by examiner

NETWORK-WIDE MALWARE MAPPING

TECHNICAL FIELD

The present disclosure relates to mapping malicious activities across a network.

BACKGROUND

Malicious software/applications (malware) refers to an application, software, program, file, code, etc. that is intentionally designed to damage and/or otherwise negatively affect a device or system, such as computer, server, endpoint/client device, etc. Malware does the damage after it is installed or otherwise introduced into the device/system. Malware can take the form of directly executable code, scripts, and/or other types of data or instructions. Not only are thousands of new types of malware discovered on a daily basis, but the newly discovered malware is also becoming increasingly sophisticated.

DESCRIPTION OF EXAMPLE EMBODIMENTS

Overview

Presented herein are techniques for retrospectively rolling back malicious activities across a network, with visualization and agentless quarantine capabilities. In particular, a network management system is configured to detect one or more malicious activities at one or more devices connected to a network. The network management system is configured to determine a malware root of the one or more malicious activities and generate a network-wide indicating a hierarchical relationship between the malicious activities spawned by the malware root and the malware root. The malicious activities spawned by the malware root represented in the network-wide malware include the one or more malicious activities and include a plurality of malicious activities spawned across a plurality of devices connected to the network.

Example Embodiments

Figure 1:
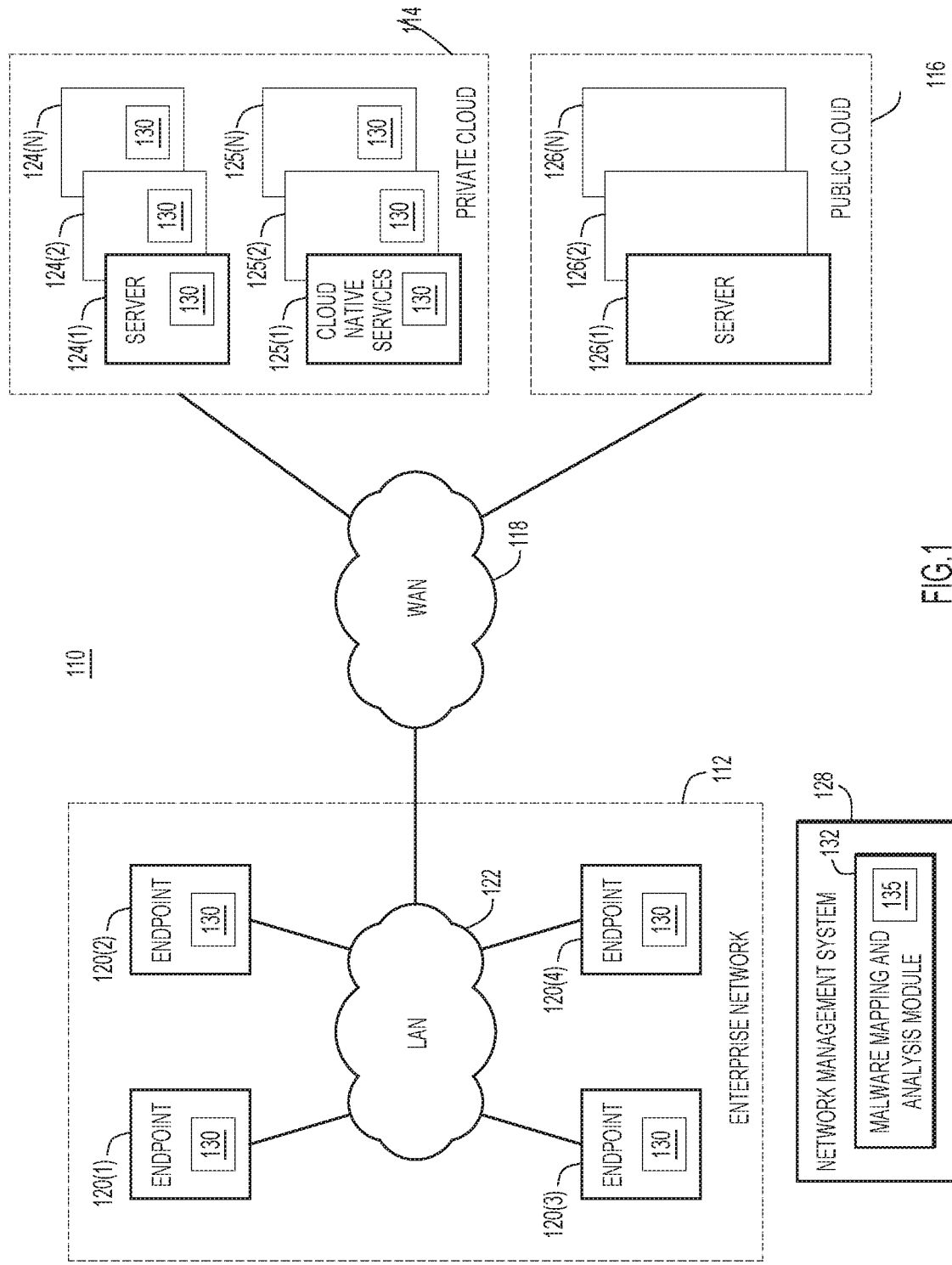
FIG. 1 is simplified block diagram of a network on which the techniques presented herein may be implemented, according to an example embodiment.

Referring to FIG. 1, shown is a simplified block diagram of an example network 110 in which the techniques presented herein may be implemented. As shown, network 110 includes an enterprise (campus) network 112, a private cloud 114, and a public cloud 116 all interconnected via a wide area network (WAN) 118.

In the example of FIG. 1, the enterprise network 112 comprises four (4) endpoints/clients (e.g., computers, servers, mobile devices, etc.), referred to as endpoints 120(1), 120(2), 120(3), and 120(4). The enterprise network 112 includes a local area network (LAN) 122 that interconnects the endpoints 120(1)-120(4), as well as connects the enterprise network 112 to the WAN 118. The LAN 122 may comprise, for example, one or more routers, switches, access points, firewalls, or other networking devices that, for ease of illustration, have been omitted from FIG. 1.

As noted, the network 110 also includes the private cloud 114 and the public cloud 116. The private cloud 114 is comprised of a plurality of servers 124(1)-124(N) and provides services exclusively to the endpoints 120(1)-120(4) in enterprise network 112. That is, private cloud 114 is a cloud that is used exclusively (only) by individual enterprise/organization associated with enterprise network 112. Although shown as a separate entity/infrastructure connected to enterprise network 112 via WAN 118, the private cloud 114 could alternatively be present in the organization's on-premises data center. In both cases, the enterprise itself owns and operates the private cloud 114.

In contrast, the public cloud 116 is a cloud, comprised of a plurality of servers 126(1)-126(N), and where an independent, third-party provider, such as Amazon Web Services (AWS) or Microsoft Azure, owns and maintains the compute resources that different customers can access over the Internet (e.g., a multi-tenant environment). In such a multi-tenant environment, the enterprise associated with enterprise network 112 does not control or maintain the public cloud 116. However, the endpoints 120(1)-120(4) can access the compute resources (e.g., services) provided by the servers 126(1)-126(N) in the public cloud 116.

As noted, the private cloud 114 and the enterprise network 112 are associated with the same enterprise (same organization). As such, in this example, the enterprise network 112 and the private cloud 114 are controlled/managed via a network management system 128. That is, the network management system 128 has access/visibility into the enterprise network 112 and the private cloud 114 (e.g., can obtain data from the various devices within enterprise network 112 and the private cloud 114).

In the example of FIG. 1, the enterprise network 112 is also using cloud native services 125(1)-125(N) (serverless, application programming interface (API) based) delivered out of private cloud 114. However, it is to be appreciated that the enterprise network 112 may also or alternatively use cloud native services delivered out of the public cloud 116. Modern cloud native services are serverless and purely API based services that may be used, for example, by applications running on both endpoints and servers within the enterprise network 112.

FIG. 1 illustrates a specific example in which the devices/entities within enterprise network 112 and the private cloud 114, such as endpoints 120(1)-126(N), servers 126(1)-126(N), and cloud native services 125(1)-125(N) include, or are otherwise associated with, network management monitoring agents 130. These network management monitoring agents 130 are configured to provide management data to the network management system 128. It is to be appreciated that the network management monitoring agents 130, and the communications with the network management system 128, may be implemented in a number of different manners in accordance with a number of different protocols and monitoring techniques. It is also to be appreciated that the use of monitoring agents is illustrative and that network management system in accordance with embodiments presented herein, such as network management system 128, may obtain management data in other manners (e.g., push/pull mechanisms, etc.).

As described further below, the network management system 128 may be formed by one or more computing devices, such as one or more computers, one or more servers, etc., and related hardware and software. In the example of FIG. 1, the network management system 128 includes a malware mapping and analysis module (malware mapping and analysis logic) 132 configured to perform aspects of the techniques presented herein.

As used herein, "malware" or a "malicious application" refers to an application, software, program, file, code, etc. intentionally introduced into a device or system that is designed to damage and/or otherwise negatively affect the device or system (e.g., a computer, server, client/endpoint, etc.). Most modern security solutions address malware through the use of lookups (e.g., cloud lookups) for security posture. In essence, these solutions compare the attributes/characteristics of an unknown/unverified application (i.e., an application that that has not yet been classified as "malicious" or "non-malicious") to attributes/characteristics of applications that are known to be malicious (or suspected of being malicious). Due to performance reasons, these solutions typically work in a non-blocking/passive mode, rather than in a blocking/active mode. In a non-blocking mode, the unverified application is introduced at a first device (e.g., an endpoint) and allowed to run for a period of time (e.g., 1200 milliseconds) while the unverified application is evaluated for malicious attributes. During this time period, if the unverified application introduced at the first device is a malicious application (i.e., is malware), then the malicious application can spawn malicious activity at other devices connected to the first device via a network. That is, during the time period in which the malicious application is being analyzed/evaluated and determined to be malicious, the malicious application can cause additional applications, including malicious applications and non-malicious (benign) applications to be executed at not only the first device, but also at other devices physically or wirelessly connected to the first device. In general, these spawned applications cause the other devices physically or wirelessly connected to the first device to perform various actions, sometimes referred to herein as "spawned actions."

The spawned applications and spawned actions are collectively and generally referred to herein as "spawned activities." However, as noted, the spawned applications may include both malicious applications, sometimes referred to herein as "spawned malicious applications," and benign applications, sometimes referred to herein "spawned benign application." Spawned malicious applications cause the other devices physically or wirelessly connected to the first device to perform various actions, sometimes referred to herein as "spawned malicious actions," that may be harmful to those devices or to still other devices physically or wirelessly connected to those devices. The spawned malicious applications and spawned malicious actions are collectively and generally referred to herein as "spawned malicious activities." Similarly, the spawned benign applications and spawned benign actions (i.e., actions caused by the spawned benign applications) are collectively and generally referred to herein as "spawned benign activities."

Since non-blocking modes are widely deployed, sophisticated malicious applications may be specifically designed to inflict significant damage to a network in just a short amount of time (i.e., before the system even realizes the application is malware). As such, network administrators may be left to act retroactively to roll back the damage caused by malware, or else accept huge performance degradation and work in the active/blocking mode. New types of malicious applications are being developed on a daily basis and these malicious applications are becoming increasingly sophisticated. Moreover, it is becoming increasingly difficult to distinguish malicious computing activity from other computer processes and, in conventional arrangements, it is not possible to determine the impact of a malicious applications on an entire network.

The performance degradations introduced by use of a blocking mode are generally unacceptable to most organizations. Therefore, it is acknowledged that many networks will operate in a non-blocking mode that will allow introduction and execution of malicious applications in a network for at least some period. The techniques presented herein acknowledge the risks inherent to the use of blocking mode and use rollback/revocation for not only long term disposition changes (e.g., hours, days) associated with malicious applications, but also for near real-time executions (e.g., milliseconds) of an initial malicious application and related malicious activity. That is, the techniques presented herein provide network administrators with the ability to perform a complete rollback of all malicious activities that are initiated by a malicious application across an entire network, including all malicious activities across endpoints, network services, cloud services, etc.

In particular, returning specifically to the example of FIG. 1, the malware mapping and analysis module 32 may be configured to identify/detect one or more malicious activities at one or more devices within the network 110. In certain examples, devices are "within a network" when they are connected to one another in some manner via a wired or wireless connection.

In accordance with certain embodiments presented herein, the malware mapping and analysis module 32 is configured to determine a "malware root" associated with the one or more detected malicious activities. As used herein, the "malware root" refers to the original malicious application that caused/spawned the one or more detected malicious activities (i.e., the origin of the one or more detected malicious activities). The malware mapping and analysis module 32 is also configured to generate a "network-wide malware mapping" in relation to the malware root. As used herein, the network-wide malware mapping is a data structure identifying not only the malware root, but also a hierarchical relationship of the malware root to all activities, including malicious and non-malicious (benign) activities, spawned by the malware root across the entire network 110. The network-wide malware mapping, which is represented in FIG. 1 by 135, is generated by obtaining information related to actions performed by devices within network 110 during a time period before and/or after the malware root is introduced (e.g., correlating, at least in time, the actions/events performed at the devices within network 110 in relation to introduction of the malware root). This analysis may also include an assessment of whether actions performed by devices within network 110 are likely to malicious or benign, as well as tracing a chain of how each of the actions or events are linked to (e.g., caused by) the malware root.

In other words, the network-wide malware mapping may include/identify not only the malware root, but also a hierarchical relationship between the malware root and all activities (e.g., malicious activities and benign activities) spawned across the entire network 110 as a result of the malware root (original malicious application), including malicious activities across endpoints 120(1)-120(4) in enterprise network 112, servers 124(1)-124(N) in private cloud 114, cloud native services 125(1)-125(N) in private cloud 114, as well as servers 26(1)-26(N) in public cloud 116. The malicious activities spawned across the entire network 110 may include spawned malicious applications (e.g., secondary malicious applications introduced at devices within network 110 as a result of the original malicious application) and/or spawned malicious actions (e.g., actions performed by devices within network 110 as a result of the original malicious application).

To generate the network-wide malware mapping, the network management system 128 utilizes information obtained from the devices in network 110. For example, in certain embodiments, the network management system 128 utilizes information obtained via agents 130 deployed across the network 110. The agents 130 may identify, track, and provide the network management system 128 with information regarding certain operations/activities that may include, for example, network communication operations, process operations (e.g., creation and execution of processes), file operations (e.g., creation and/or transfer of files), registry changes, and/or other operations (WMI, COM, named pipes, etc.).

As described further below, the network-wide malware mapping (mapping of the spawned activities relative to the malware root) may be used to implement automated, partially-automated, and/or manual rollback of the malware root and the spawned malicious activities. In certain examples, the network-wide malware mapping may be used to generate a graphical representation of the spawned activities and/or to perform agentless quarantine via application programming interfaces (APIs). As described further below, the network-wide malware mapping enables a retrospective rolling back of all malicious activities across the entire network 110, including enterprise network 112, private cloud 114, and public cloud 116.

Figure 2:
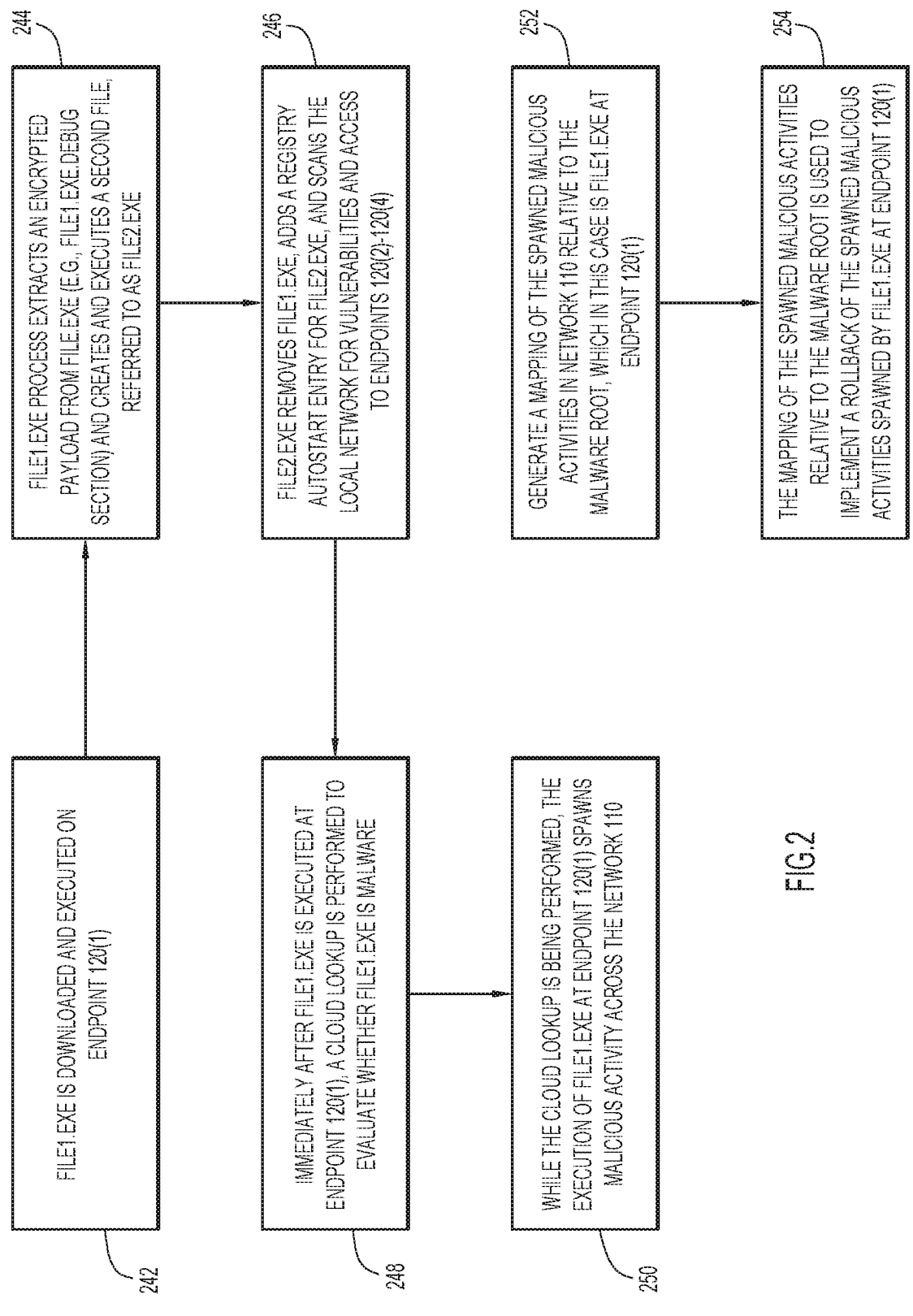
FIG. 2 is a detailed flow diagram illustrating aspects of the techniques presented herein, according to an example embodiment.

FIG. 2 is a detailed flow diagram illustrating aspects of the techniques presented herein. For ease of description, the flow diagram of FIG. 2 will be described with reference to network 110 of FIG. 1.

The flow 240 of FIG. 2 begins at 242 where a first file, referred to as "File1.exe" is downloaded and executed on endpoint 120(1). At 244, a File1.exe process extracts an encrypted payload from File.exe (e.g., File1.exe.debug section) and creates and executes a second file, referred to as "File2.exe." Execution of the File1.exe process is terminated and, at 246, the File2.exe performs several operations. In particular, File2.exe removes File1.exe, adds a registry "Autostart" entry for File2.exe, and scans the local network for vulnerabilities (e.g., Server Message Block (SMB) vulnerabilities) and access to endpoints 120(2)-120(4).

At 248, immediately after File1.exe is executed at endpoint 120(1), a cloud lookup is performed to evaluate whether File1.exe is malware. This cloud lookup process, which in this example takes about 200 ms, determines that File1.exe is in fact malware, but the status of File2.exe is unknown. At 250, while the cloud lookup is being performed, several operations occur across network 110. In particular, several files and processes are created on each of endpoints 120(2)-120(4) (e.g., "File4.exe" at endpoint 120(2), "File1.exe" at endpoint 120(3)). Moreover, endpoint 120(2) locates an anonymous File Transfer Protocol (FTP) share within the network and adds a file referred to as "File6.doc." Endpoint 120(3) obtains a file from an SMB share and sends this file, referred to as "File7.pdf" to a file hosting service. Endpoint 120(4) uses locally cached public cloud command-line interface (CLI) credentials to create a new public cloud compute service (e.g., a service to run code without provisioning or managing servers) and an application programming interface (API) gateway call. These operations result in the creation of new records in one or more of the servers 126(1)-126(N) in public cloud 116. In other words, at 250, the execution of File1.exe at endpoint 120(1) spawns malicious activity across the network 110 (i.e., causes malicious activity to spread across the network), including at the other endpoints 120(2)-120(4) within the enterprise network 112, to one or more of the servers 124(1)-124(N) in private cloud 114, cloud native services 125(1)-125(N) in private cloud 114, and/or one or more of the servers 126(1)-126(N) in public cloud 116.

At 252, the techniques presented herein are utilized to generate a network-wide malware mapping 135 (i.e., mapping of the spawned malicious and benign activities in network 110 relative to the malware root, which in this case is File1.exe at endpoint 120(1)). As noted, this mapping may include/identify all malicious and benign activities across the entire network 110, including activities across endpoints 120(1)-120(4), servers 124(1)-124(N) in private cloud 114, cloud native services 125(1)-125(N) in private cloud 114, as well as servers 126(1)-126(N) in public cloud 116.

At 254, the network-wide malware mapping 135 is used to implement a rollback of the malicious activities spawned by File1.exe at endpoint 120(1). That is, once malicious activities are detected, the techniques presented herein enable the initiation of a retrospective revocation process across the network 110 to rollback all the malicious activities started by the malware root. In the example of FIG. 2, the rollback includes, among other operations:

Termination and removal of File2.exe from endpoint 120(1).
Registry entry is removed from endpoint 120(1).
Files and processes created on endpoints 120(2)-120(4) are rolled back.
File6.doc is removed from FTP share.
File7.pdf is quarantined and, if not accessible, an alarm is issued.
The public cloud services/objects created by malicious activity to provide additional database level access are removed Malicious Database records on cloud native services 125(1)-125(N) are removed.

Figure 3:
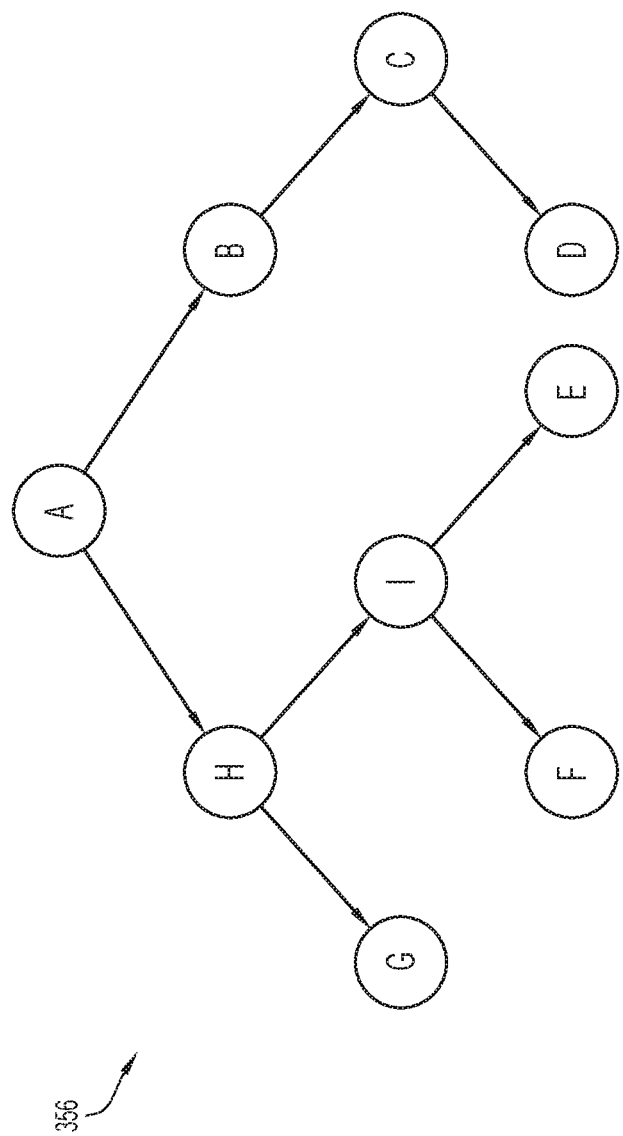
FIG. 3 is a graph with nodes illustrating a network-wide malware mapping relative to a malware root, according to an example embodiment.

The above rollback operations are enabled via the generation of the network-wide malware mapping 135 (mapping of the spawned activities, including malicious and benign activities, in network 110 relative to the malware root, namely File1.exe at endpoint 120(1)). Within the network management system 128 itself, the network-wide malware mapping is a hierarchical data structure, which may represented as a graph with nodes, such as graph 356 shown in FIG. 3. In this graph with nodes, the root node (i.e., node A in FIG. 3) is the original malicious activity (malware root) and the branches/leaves are child entities (child nodes) associated with artifacts/activities created as a result of the malware root. In accordance with certain examples, the leaves can interact with each other (e.g., node E element can inject Dynamic Link Library (DLL) into node D (process)).

In accordance with embodiments presented herein, the network-wide malware mapping can be used in a number of different manners. For example, as shown in FIG. 2, some malicious activity may be spawned at devices outside of the control of the enterprise (e.g., at one or more servers 126(1)-126(N)), then automatic quarantine via application programming interfaces (APIs) may be executed as part of the rollback process. Stated differently, the network-wide malware mapping (e.g., mapping of the spawned activities across the network relative to the malware root) can be used to perform agentless quarantine via APIs when, for example, as a result of the malware some files have been created on cloud shares or other third-party assets.

In accordance with embodiments presented herein, the network-wide malware mapping may also or alternatively be used to generate a hierarchical graphical representation of the spawned activities across the network, in relation to the malware root. That is, the network management system 128 may be configured to generate and display a visualized chain of actions (malicious and/or benign activities) that were started across the network 110 by the malware root. The graphical representation may be based on the internal mapping data structure, such as graph 356 of FIG. 3 (e.g., where the root node is the original malicious activity (malware root), with child nodes associated with artifacts created as a result of the malware root). In this way, an internal graph-type database can be quickly created using analytics and automation.

Figure 4:
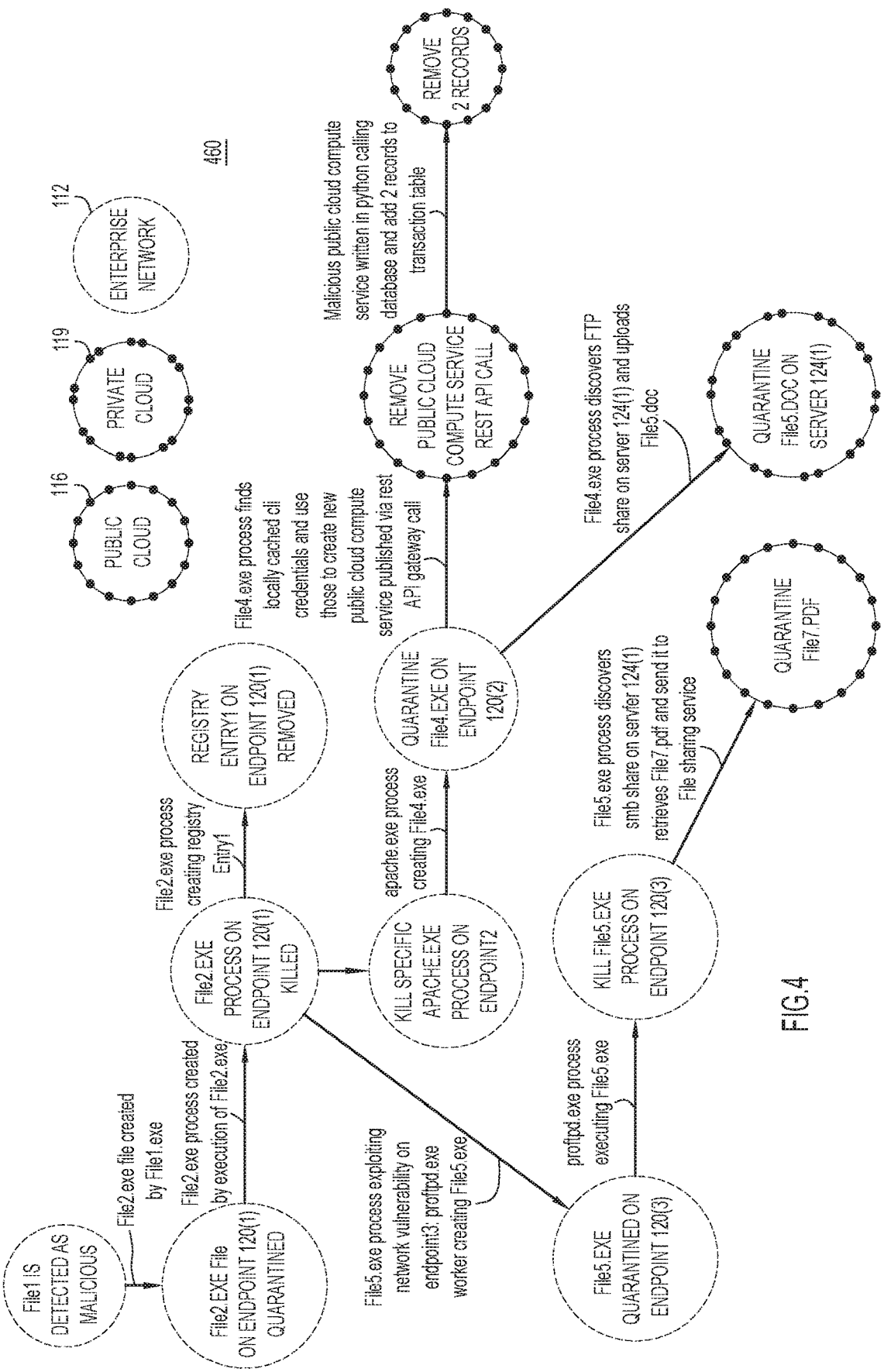
FIG. 4 is a diagram illustrating one example graphical representation of a network-wide malware mapping associated with FIG. 2, according to an example embodiment.

FIG. 4 is a diagram illustrating one example graphical representation 460 of a network-wide malware mapping associated with FIG. 2, in accordance with embodiments presented herein. More specifically, in FIG. 4, the circle-shaped elements and associated text generally represents nodes of an internal graph (generated for FIG. 2), while the arrows and associated text represent edge actions associated spawning of activity from the execution of File1.exe at endpoint 120(1). The circle-shaped elements shown in FIG. 4 illustrate the actions that are performed to rollback the malicious activities that have spread across network 110. The nodes (circle-shaped elements) can be, but are not limited to, processes, files, network state, while the edges actions (arrows) can be, but are not limited to, network communication, file actions, user actions. In certain examples, the nodes of graphical representation 460 (i.e., the circle-shaped elements) could be expanded to provide more information relating to, for example, the associated device, the actions performed at the device, attributes of the malicious activity, etc.

In accordance with embodiments presented herein, the rollback operations shown in FIG. 4 may be performed automatically based on predefined policies. In other embodiments, the rollback operations shown in FIG. 4 may be performed semi-automatically or on demand (i.e., manual intervention). In certain examples, the rollback process can be started from the malware root and continues recursively thru all child entities to remove all the associated artifacts (or warn of any artifacts that cannot be removed. As noted above, the rollback operations shown in FIG. 4 are enabled via the generation of the mapping of the spawned malicious activities in network 110 relative to the malware root (i.e., File1.exe at endpoint 120(1)).

The rollback process might be complex involving, for example, multiple types of malicious activities across multiple endpoints and some of the malicious activities may be difficult to revoke. For example, a malicious application may add a specific new registry entry and, in the meantime, an operating system or additional application may modify or use that entry that has been retrospectively found to have been initially created by the malware. Such complexities may leave a network administrator unsure as whether or not the added registry entry should be removed and, if removed, what impact such removal would have on the network. As such, certain embodiments presented herein may include an impact and risk assessment process is for the rollback process. That is, the techniques presented herein may configured to implement a simulation enabling the network management system 128 to estimate the impact and risk of rollback. In certain embodiments, the impact and risk assessment process includes a determination of whether a spawned activity is malicious or benign More specifically, for actions which would be the part of manual, semi-automated, or manual automated rollback process, the rollback risk and/or the rollback impact associated with taking the rollback action can be estimated and an indication of the risk and/or impact can be provided to a user (e.g., network administrator) and/or a control application for the rollback. As used herein, the "rollback impact" associated with taking the rollback action describes the level of possible negative damage for certain (or associated) entities being rolled back. For example, removing a Dynamic Link Library (DLL) file used by a web browser application may prevent the application from functioning correctly. As such, the rollback impact for that application may be considered "high" for that entity (e.g., the web browser). However, the impact of removal of the DLL may less for other applications.

As used herein, the "rollback risk" associated with taking the rollback action is the overall value which would be derived out of the impact, depending on the type of entity and historical data. For example, a high impact of DLL file removal for a web browser may cause only that application to be damaged so the overall risk is considered "low." In contrast, removal of a DLL file that is related to an operating system might cause the entire whole operating system to be damaged, thus in this case the rollback risk associated with such removal may be considered "high."

In accordance with embodiments presented herein, the system (e.g., network management system 128) may analyze a number of different factors when assessing impact and risk. These factors may include, for example, whether the activity is likely malicious or benign, historical information from network connected nodes (e.g., from endpoints, public cloud servers, private cloud servers), including information related to application crashes, OS level crashes, other outages caused by specific activity. In certain examples, the assessment of risk and impact may consider data related to other networks (e.g., big data/knowledge gathered in cloud) and, as a result, the system may be configured to learn and adapt to make better estimations.

In embodiments that provide a user with a graphical representation of a network-wide malware mapping, the user can also be provided with an indication of the impact and/or an indication of the risk for each action. These indications may be qualitative values (e.g., "low," "medium," or "high" risk or impact), numerical scores (e.g., a score of "1" for low risk or low impact and a score of "10" for high risk or high impact), or other types of indication (e.g., a rollback action associated with a high impact and/or high risk may be colored red, while a rollback action associated with a low impact and/or low risk may be colored green). In certain examples, the indication of the impact and the indication of the risk for each rollback action may be provided separately, while in other embodiments the impact and risk are combined to provide one combined risk and impact indication.

As noted above, network-wide rollback operations in accordance with embodiments presented herein may be performed automatically based on predefined policies, semi-automatically, or on demand (i.e., manual intervention). In certain examples, the determination as to whether the rollback process, or a specific rollback action, may be performed automatically may be based on the results of impact and risk estimation. For example, if the potential negative impact and/or risk for all rollback actions are low, then the system can make a decision to execute complete rollback automatically. However, if the potential negative impact and/or risk associated with one or more rollback actions is high (e.g., a qualitative "high," above a numerical threshold, etc.), then the system may request manual approval of those rollback actions before they would be performed (e.g., leave higher risk rollback activities for manual approval).

In addition to the impact and/or risk estimations, the system may use other conditions to determine whether or not a rollback action should be performed automatically. For example, in making the automatic or manual determination, the system may assess whether the asset is a protected asset, the incident priority, the threat details, and so on. These various conditions, including the impact and/or risk estimations, are collectively and generally referred to herein as "automation policies" for a rollback process.

A challenge associated with rollback actions is to prove that the security solution caused some problems/outage by certain activity. In accordance with certain embodiments presented herein, a dedicated repository for a rollback process may be maintained and would include all the activities which were executed to rollback malicious activity. As such, the techniques presented herein may make it possible to correlate specific activities with an outage.

Figure 5:
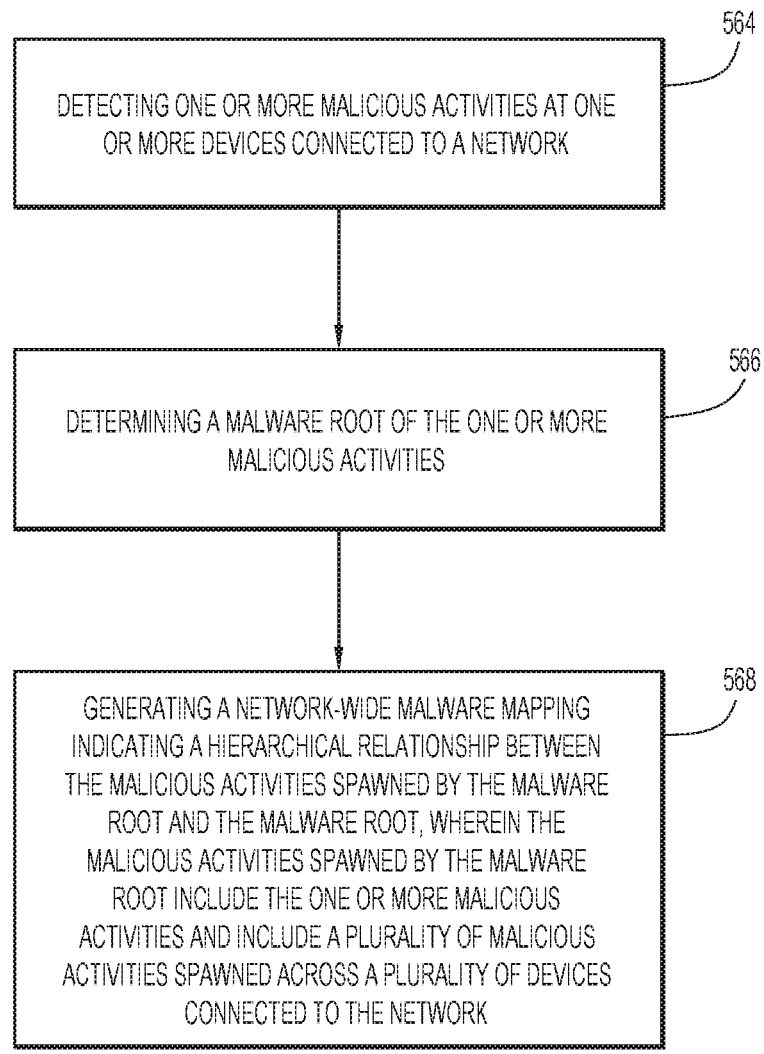
FIG. 5 is a flowchart of a method, in accordance with certain embodiments presented herein.

FIG. 5 is a high level flowchart of a method 562 in accordance with embodiments presented herein. Method 562 begins at 564 where a network management system detects one or more malicious activities at one or more devices connected to a network. At 564, the network management system determines a malware root of the one or more malicious activities. At 566, the network management system generates a network-wide malware mapping indicating a hierarchical relationship between the malicious activities spawned by the malware root and the malware root. The malicious activities spawned by the malware root include the one or more malicious activities and include a plurality of malicious activities spawned across a plurality of devices connected to the network.

Figure 6:
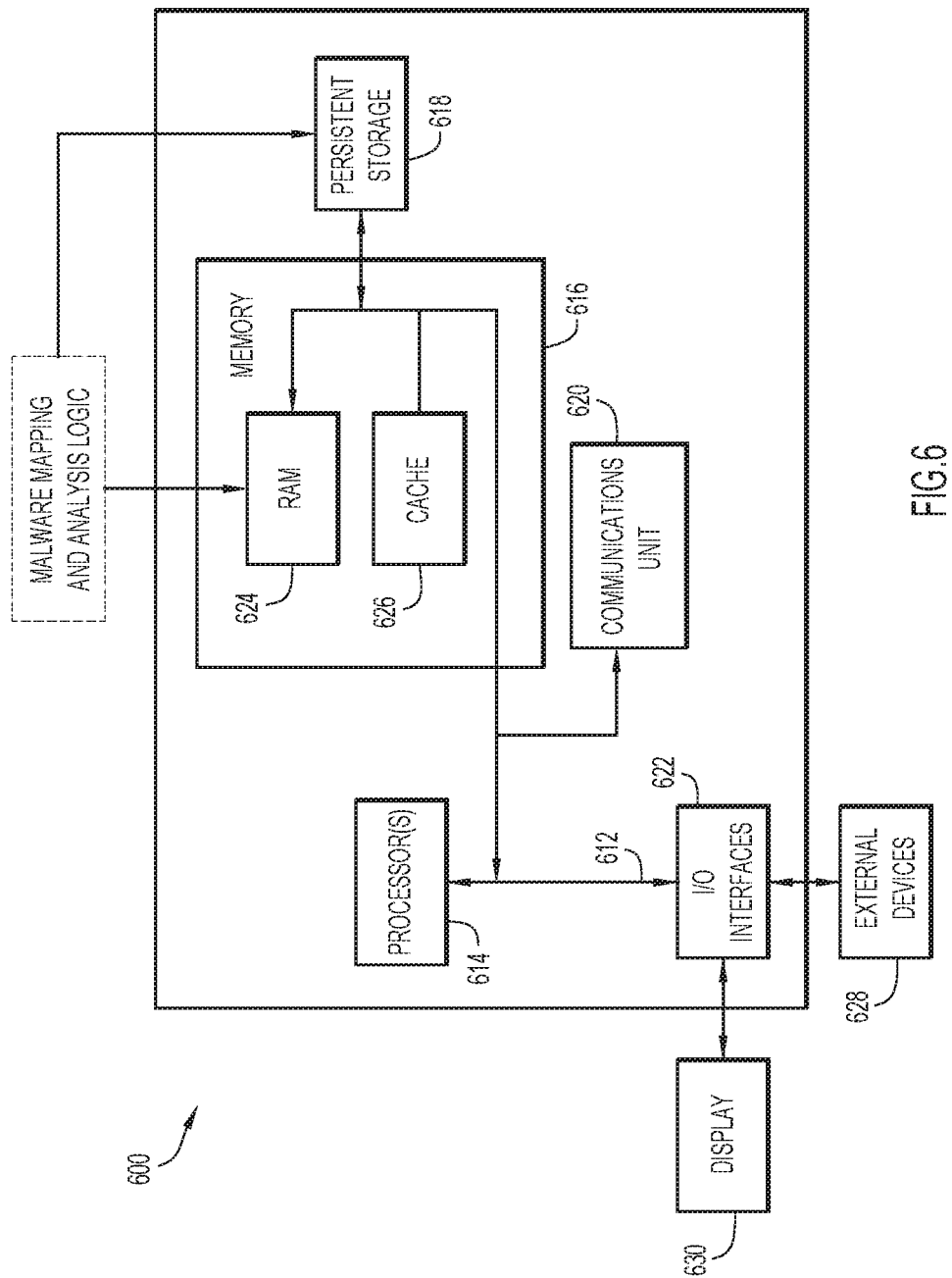
FIG. 6 is a block diagram of a network management system configured to execute certain operations described with reference to FIGS. 1-5, in accordance in accordance with certain embodiments presented herein.

Reference is now made to FIG. 6, which illustrates a hardware block diagram of a device 600 that may perform the functions of any of the servers or computing or control entities referred to herein, such as a network management system described above with reference FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the malware mapping and analysis logic, which may executed to perform certain operations described herein (e.g., operations described with reference to a malware mapping and analysis module and/or with reference to a network management system in FIGS. 1-5) may be stored in memory 616 or memory 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor. In certain examples, the display 630 may be used to display a visual representation of a network-wide malware mapping, as described elsewhere herein.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a method is provided. The method comprises: detecting one or more malicious activities at one or more devices connected to a network; determining a malware root of the one or more malicious activities; and generating a network-wide malware mapping indicating a hierarchical relationship between the malicious activities spawned by the malware root and the malware root, wherein the malicious activities spawned by the malware root include the one or more malicious activities and include a plurality of malicious activities spawned across a plurality of devices connected to the network.

In certain aspects, determining the malware root of the one or more malicious activities includes: determining a specific device connected to the network at which a malicious application corresponding to the malware root was initially executed. In certain aspects, generating the network-wide malware mapping includes: obtaining information from the plurality of devices connected to the network, wherein the information indicates actions performed at each of the plurality of devices during a time period following introduction of the malware root into the network; and correlating, at least in time, the actions performed at each of the plurality of devices during the time period with the malware root.

In certain aspects, the method further comprises: initiating, based on the network-wide malware mapping, agentless quarantine via one or more application programming interfaces (APIs) of one or more of the plurality of malicious activities spawned by the malware root. In certain aspects, the method further comprises: generating, at a display screen, a visual representation of the network-wide malware mapping.

In certain aspects, the method further comprises: initiating a network-wide rollback of the plurality of malicious activities spawned across the plurality of devices connected to the network. In further aspects, initiating the network-wide rollback comprises: initiating an automatic network-wide rollback of the plurality of malicious activities spawned across the plurality of devices connected to the network. In further aspects, prior to initiating the network-wide rollback, the method comprises: assessing one or more effects of the network-wide rollback on at least one of the plurality of devices connected to the network. In certain aspects, assessing one or more effects of the network-wide rollback on at least one of the plurality of devices connected to the network comprises: assessing an impact, on at least a first one of at least one of the plurality of devices, of performing a rollback of an action previously performed on at least one of the plurality of devices connected to the network. In certain aspects, assessing one or more effects of the network-wide rollback on at least one of the plurality of devices connected to the network comprises: assessing a risk associated with performing a rollback of an action previously performed on at least one of the plurality of devices connected to the network. In certain aspects, assessing one or more effects of the network-wide rollback on at least one of the plurality of devices connected to the network comprises: performing a simulation to assess one or more of an impact or risk associated with performing a rollback of an action previously performed on at least one of the plurality of devices connected to the network.

In another aspect, one or more non-transitory computer readable storage media encoded with instructions are provided. The one or more non-transitory computer readable storage media are encoded with instructions that, when executed by a processor, cause the processor to: detect one or more malicious activities at one or more devices connected to a network; determine a malware root of the one or more malicious activities; and generate a network-wide malware mapping indicating a hierarchical relationship between the malicious activities spawned by the malware root and the malware root, wherein the malicious activities spawned by the malware root include the one or more malicious activities and include a plurality of malicious activities spawned across a plurality of devices connected to the network.

In another aspect, an apparatus is provided. The apparatus comprises: one or more network interfaces; memory; and one or more processors configured to: detect one or more malicious activities at one or more devices connected to a network, determine a malware root of the one or more malicious activities, and generate a network-wide malware mapping indicating a hierarchical relationship between the malicious activities spawned by the malware root and the malware root, wherein the malicious activities spawned by the malware root include the one or more malicious activities and include a plurality of malicious activities spawned across a plurality of devices connected to the network.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    detecting one or more malicious activities at one or more devices connected to a network;
    determining a malware root of the one or more malicious activities;
    generating a network-wide malware mapping indicating a hierarchical relationship between all activities spawned by the malware root and the malware root,
    wherein the network-wide malware mapping identifies all of the activities spawned by the malware root, including a plurality of activities spawned across a plurality of devices connected to the network as a result of the malware root;
    assessing one or more effects of performing a network-wide rollback of at least one malicious activity spawned on at least one of the plurality of devices connected to the network, wherein assessing the one or more effects comprises assessing a risk associated with performing a rollback of an action previously performed on the at least one of the plurality of devices connected to the network wherein the risk is based, at least in part, on a determination indicating whether each activity spawned by the malware root is a malicious activity or a non-malicious activity; and
    initiating a network-wide rollback of a plurality of malicious activities spawned across the plurality of devices connected to the network based, at least in part, on the risk associated with performing the rollback of the action previously performed on the at least one of the plurality of devices connected to the network.

2. The method of claim 1, wherein determining the malware root of the one or more malicious activities includes:
    determining a specific device connected to the network at which a malicious application corresponding to the malware root was initially executed.

3. The method of claim 1, wherein generating the network-wide malware mapping includes:
    obtaining information from the plurality of devices connected to the network, wherein the information indicates actions performed at each of the plurality of devices during a time period following introduction of the malware root into the network; and
    correlating, at least in time, the actions performed at each of the plurality of devices during the time period with the malware root.

4. The method of claim 1, further comprising:
    initiating, based on the network-wide malware mapping, agentless quarantine via one or more application programming interfaces (APIs) of one or more of a plurality of malicious activities spawned by the malware root.

5. The method of claim 1, further comprising:
    generating, at a display screen, a visual representation of the network-wide malware mapping.

6. The method of claim 1, wherein initiating the network-wide rollback comprises:
    initiating an automatic network-wide rollback of the plurality of malicious activities spawned across the plurality of devices connected to the network.

7. The method of claim 1, wherein assessing one or more effects of the network-wide rollback on at least one of the plurality of devices connected to the network comprises:
    assessing an impact, on at least a first one of at least one of the plurality of devices, of performing a rollback of an action previously performed on the at least one of the plurality of devices connected to the network.

8. The method of claim 1, wherein assessing one or more effects of the network-wide rollback on at least one of the plurality of devices connected to the network comprises:
    performing a simulation to assess one or more of an impact or risk associated with performing a rollback of an action previously performed on at least one of the plurality of devices connected to the network.

9. The method of claim 1, wherein a first malicious activity spawned as a result of the malware root for a first device connected to the network is different than a second malicious activity spawned as a result of the malware root for a second device connected to the network.

10. The method of claim 1, wherein initiating the network-wide rollback of the plurality of malicious activities spawned across the plurality of devices connected to the network includes initiating an automatic network-wide rollback of the plurality of malicious activities spawned across the plurality of devices connected to the network based on an assessment that the risk and an impact of performing a rollback of the action previously performed on the at least one of the plurality of devices connected to the network is low.

11. The method of claim 1, wherein initiating the network-wide rollback of the plurality of malicious activities spawned across the plurality of devices connected to the network includes requesting manual approval for initiating the network-wide rollback of the plurality of malicious activities spawned across the plurality of devices connected to the network based on an assessment that the risk and an impact of performing a rollback of the action previously performed on the at least one of the plurality of devices connected to the network is high.

12. One or more non-transitory computer readable storage media encoded with instructions that, when executed by a processor, cause the processor to:
   detect one or more malicious activities at one or more devices connected to a network;
   determine a malware root of the one or more malicious activities;
   generate a network-wide malware mapping indicating a hierarchical relationship between all activities spawned by the malware root and the malware root,
   wherein the network-wide malware mapping identifies all of the activities spawned by the malware root, including a plurality of activities spawned across a plurality of devices connected to the network as a result of the malware root;
   assess one or more effects of performing a network-wide rollback of at least one malicious activity spawned on at least one of the plurality of devices connected to the network, wherein to assess the one or more effects comprises assessing a risk associated with performing a rollback of an action previously performed on the at least one of the plurality of devices connected to the network wherein the risk is based, at least in part, on a determination indicating whether each activity spawned by the malware root is a malicious activity or a non-malicious activity; and
   initiate a network-wide rollback of a plurality of malicious activities spawned across the plurality of devices connected to the network based, at least in part, on the risk associated with performing the rollback of the action previously performed on the at least one of the plurality of devices connected to the network.

13. The non-transitory computer readable storage media of claim 12, wherein the instructions executed to determine the malware root of the one or more malicious activities include instructions that, when executed by a processor, cause the processor to:
   determine a specific device connected to the network at which a malicious application corresponding to the malware root was initially executed.

14. The non-transitory computer readable storage media of claim 12, wherein the instructions executed to generate the network-wide malware mapping include instructions that, when executed by a processor, cause the processor to:
   obtain information from the plurality of devices connected to the network, wherein the information indicates actions performed at each of the plurality of devices during a time period following introduction of the malware root into the network; and
   correlate, at least in time, the actions performed at each of the plurality of devices during the time period with the malware root.

15. The non-transitory computer readable storage media of claim 12, further comprising instructions that, when executed by a processor, cause the processor to:
   initiate, based on the network-wide malware mapping, agentless quarantine via one or more application programming interfaces (APIs) of one or more of a plurality of malicious activities spawned by the malware root.

16. The non-transitory computer readable storage media of claim 12, further comprising instructions that, when executed by a processor, cause the processor to:
   generate, at a display screen, a visual representation of the network-wide malware mapping.

17. The non-transitory computer readable storage media of claim 12, wherein the instructions executed to assess the one or more effects of performing the network-wide rollback of at the least one malicious activity spawned on at the least one of the plurality of devices connected to the network further include instructions that, when executed by a processor, cause the processor to:
   assess an impact, on at least a first one of at least one of the plurality of devices, of performing a rollback of an action previously performed on at least one of the plurality of devices connected to the network.

18. The non-transitory computer readable storage media of claim 12, wherein the instructions executed to assess the one or more effects of performing the network-wide rollback of at the least one malicious activity spawned on at the least one of the plurality of devices connected to the network further include instructions that, when executed by a processor, cause the processor to:
   perform a simulation to assess one or more of an impact or risk associated with performing a rollback of an action previously performed on at least one of the plurality of devices connected to the network.

19. An apparatus comprising:
one or more network interfaces;
memory; and
one or more processors configured to:
   detect one or more malicious activities at one or more devices connected to a network,
   determine a malware root of the one or more malicious activities,
   generate a network-wide malware mapping indicating a hierarchical relationship between all activities spawned by the malware root and the malware root,
   wherein the network-wide malware mapping identifies all of the activities spawned by the malware root, including a plurality of activities spawned across a plurality of devices connected to the network as a result of the malware root;
   assess one or more effects of performing a network-wide rollback of at least one malicious activity spawned on at least one of the plurality of devices connected to the network, wherein to assess the one or more effects comprises assessing a risk associated with performing a rollback of an action previously performed on the at least one of the plurality of devices connected to the network wherein the risk is based, at least in part, on a determination indicating whether each activity spawned by the malware root is a malicious activity or a non-malicious activity; and initiate a network-wide rollback of a plurality of malicious activities spawned across the plurality of devices connected to the network based, at least in part, on the risk associated with performing the rollback of the action previously performed on the at least one of the plurality of devices connected to the network.

20. The apparatus of claim 19, further comprising a display screen, wherein the one or more processors are configured to generate, at the display screen, a visual representation of the network-wide malware mapping.

* * * * *